(12) United States Patent
Smutny et al.

(10) Patent No.: US 6,486,400 B1
(45) Date of Patent: Nov. 26, 2002

(54) ACOUSTIC GROMMET

(75) Inventors: Dale Joseph Smutny, Canfield, OH (US); Glenn Anthony Warner, Niles, OH (US); Ajay Bhargava, Boardman, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/953,896

(22) Filed: Sep. 18, 2001

(51) Int. Cl.$^7$ .................................................. H02G 3/18
(52) U.S. Cl. ................................ 174/65 G; 174/152 G; 174/153 G; 16/2.1
(58) Field of Search .................... 174/65 G, 153 G, 174/152 R, 152 G, 135; 248/56; 16/2.1, 2.2, 2.3; 439/604, 587, 274, 275

(56) References Cited

U.S. PATENT DOCUMENTS

| | | | |
|---|---|---|---|
| 4,685,173 A | | 8/1987 | Pavur |
| 4,797,513 A | | 1/1989 | Ono et al. |
| 4,959,509 A | | 9/1990 | Takeuchi et al. |
| 5,270,487 A | | 12/1993 | Sawamura |
| 5,739,475 A | * | 4/1998 | Fujisawa et al. ........ 174/153 G |
| 5,856,635 A | * | 1/1999 | Fujisawa et al. .............. 248/56 |
| 5,981,877 A | | 11/1999 | Sakata et al. |
| 6,088,874 A | * | 7/2000 | Nakata et al. ................. 16/2.1 |
| 6,088,875 A | * | 7/2000 | Ono et al. ............... 174/153 G |
| 6,240,597 B1 | * | 6/2001 | Mochizuki ..................... 16/2.2 |
| 6,297,457 B1 | * | 10/2001 | Yamada et al. ......... 174/153 G |
| 6,353,185 B1 | * | 3/2002 | Sakata ..................... 174/152 G |

* cited by examiner

Primary Examiner—Anthony Dinkins
Assistant Examiner—Angel R. Estrada
(74) Attorney, Agent, or Firm—Thomas N. Twomey

(57) ABSTRACT

A one-piece grommet able to receive auxiliary wires without a sacrifice in sound-dampening properties contains: a main body having a primary passageway for receiving a wire harness; an annular body having an acoustic chamber formed in a front flange portion thereof and an annular panel-fitting groove formed between intermediate and back flange portions thereof; a secondary passageway formed between the annular and main bodies and disposed for receipt of an auxiliary wire; and a back annular rim section defined between the main and annular bodies and having one or more through-holes and one or more hollow protruding members having removable ends and covering the through-hole(s), the through-holes and protruding members being disposed in communication with the secondary passageway. The secondary passageway does not pass through the acoustic chamber, the annular panel-fitting groove or the primary passageway.

14 Claims, 3 Drawing Sheets

ACOUSTIC GROMMET

BACKGROUND OF THE INVENTION

The present invention relates to grommets. More particularly, this invention relates to acoustic grommets for use in passing a wire bundle through a panel which separates two compartments, wherein the grommet prevents noise and water from being passed through the grommet and the wire bundle.

A grommet is typically used on a wire harness or bundle to prevent water intrusion from an environmentally exposed area (e.g., engine compartment in a vehicle) to an environmentally controlled area (e.g., inside of a vehicle). In addition to preventing water intrusion, grommets for use in the current automotive market need to have the flexibility and ability to perform two additional functions. First, grommets are increasingly required to dampen noise intrusion through the grommet. Second, grommets need to be capable of allowing additional wire content after the vehicle is manufactured, i.e., aftermarket applications. This latter function needs to be accomplished without compromising the first function, i.e., noise reduction.

Grommets which are said to provide both waterproofing and soundproofing benefits in automobiles are disclosed, e.g., in U.S. Pat. Nos. 4,685,173; 4,797,513; 4,959,509; 5,270,487; and 5,981,877. A grommet assembly which is designed to allow both a main wire harness and an auxiliary wire harness to pass therethrough is described in U.S. Pat. No. 4,959,509.

Conventional grommets which contain air or acoustic chambers either use a two-part design or do not allow for secondary (aftermarket) applications.

A primary object of this invention is to provide a watertight grommet having sound-dampening characteristics, wherein the grommet is a one-piece structure containing an acoustic chamber and means for allowing for secondary (aftermarket) applications.

A further object of this invention is to provide the grommet of the preceding object wherein the grommet allows for secondary applications without sacrificing the sound-dampening characteristics of the grommet.

Another object of this invention is to provide the grommet of the preceding objects, wherein the grommet is cost-effective.

These and other objects are achieved in the present invention.

SUMMARY OF THE INVENTION

The present invention provides a cost-effective one-piece grommet that prevents water intrusion, has sound dampening properties and further has the ability to add aftermarket applications without compromising the sealing and/or acoustic performance of the grommet.

Broadly, the one-piece grommet of this invention contains:

a hollow main body having a front opening, a back opening, and central primary passageway extending between the front and back openings, the central primary passageway being disposed for receipt of a primary wire, wire harness or wire bundle;

an annular body surrounding a portion of the main body and being spaced from and integrally joined to the main body, the annular body having a cylindrical hollow central portion, a front flange portion, an acoustic chamber formed in the front flange portion, an intermediate flange portion, a back flange portion, and an annular panel-fitting groove formed between the intermediate and back flange portions;

a secondary passageway formed between the inner wall of the annular body and the main body, the secondary passageway being disposed for receipt of at least one auxiliary wire and being spaced inwardly from the acoustic chamber and the annular panel-fitting groove and outwardly from the primary passageway such that the secondary passageway does not pass through the acoustic chamber, the annular panel-fitting groove or the primary passageway; and a back annular rim section defined between the back opening of the main body and the inner wall of the annular body, the annular rim section having formed therein one or more through-holes and one or more protruding members having removable ends and covering the one or more through-holes, the one or more through-holes and the one or more protruding members being disposed in communication with the secondary passageway.

In the grommet of this invention, the means for allowing auxiliary wire(s) or wire bundle(s) to be added after the grommet has been installed (i.e., the secondary passageway and the corresponding through-holes and protruding members formed in the annular rim section) does not compromise the sound dampening properties of the grommet because the secondary passageway does not pass through the acoustic chamber. In addition, the secondary passageway does not pass through the primary passageway of the main body and, therefore, does not compromise any sealant which may be applied to the primary passageway or the primary wire harness. Furthermore, the secondary passageway does not compromise the sealing of the grommet to a panel because the passageway does not pass through or otherwise interfere with the annular panel-fitting groove.

The grommet of this invention is particularly suitable for use in the automotive industry, where the grommet would typically be attached to a firewall located between the engine compartment and the passenger compartment.

DETAILED DESCRIPTION OF THE DRAWINGS

As stated above, the present invention is directed to a one-piece grommet having watertight and sound-dampening characteristics and composed of an acoustic chamber and a secondary passageway which allows one or more auxiliary wires to be inserted through the grommet after the grommet has already been secured to the panel but which does not interfere with the sound-dampening or watertight characteristics of the grommet.

The grommet of this invention will be described with reference to FIGS. 1–3.

Figure 1:
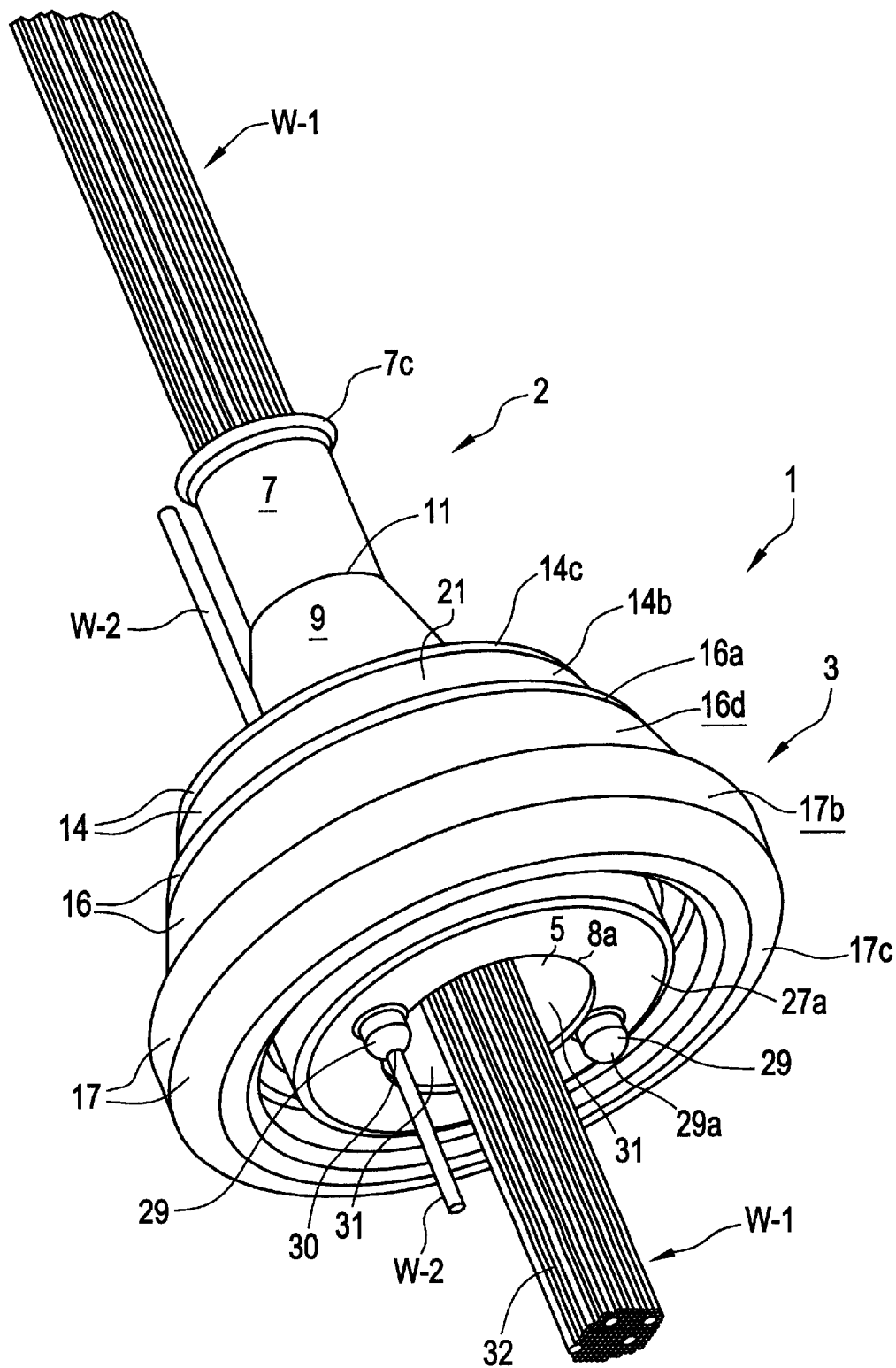
FIG. 1 is a perspective view of the grommet of this invention, wherein the grommet is shown supporting a wire harness.
Figure 2:
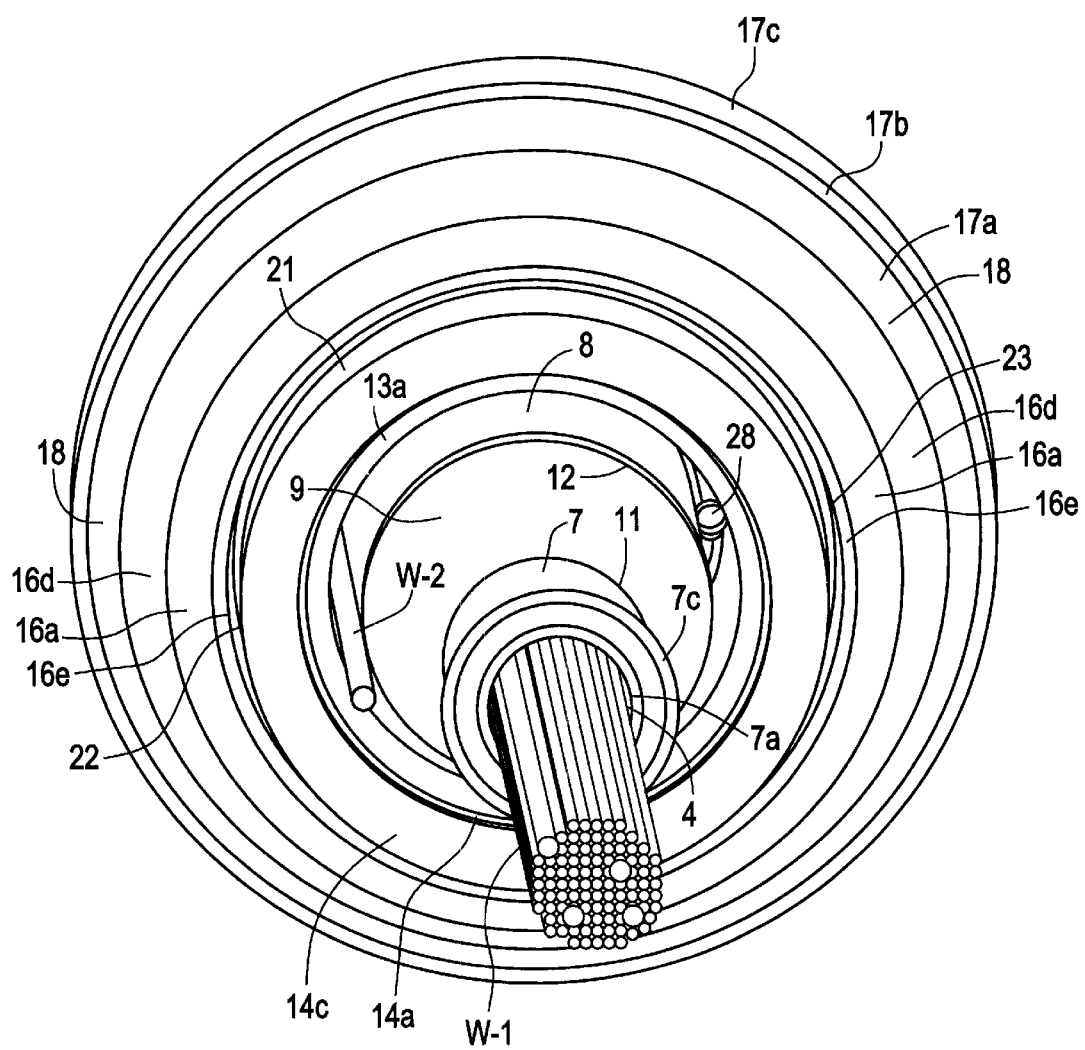
FIG. 2 is a rear view of the grommet/wire harness combination shown in FIG. 1.
Figure 3:
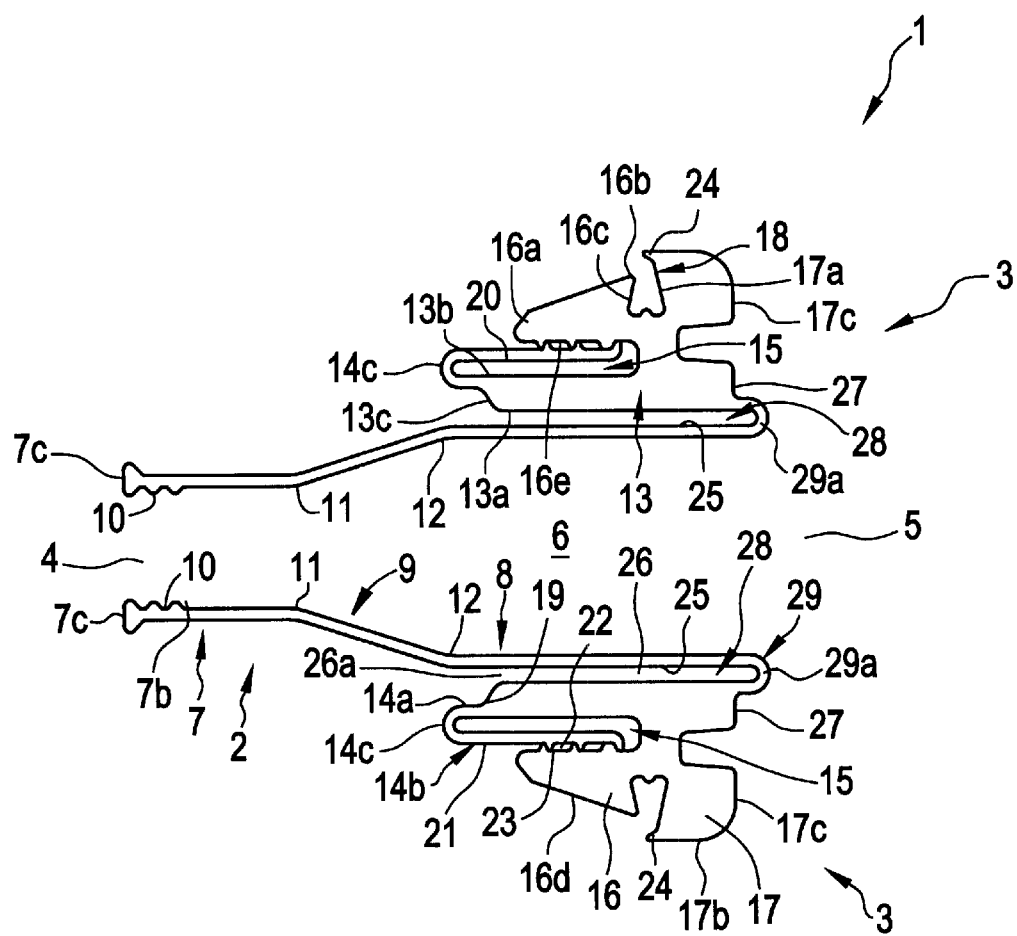
FIG. 3 is a longitudinal cross-sectional view of the grommet of this invention.

As shown in FIGS. 1–3, the grommet of this invention, which is generally designated by reference numeral 1, is composed of a hollow main body 2 and an annular body 3.

Main body 2 has a front opening 4, a back opening 5, and a central primary passageway 6 extending between the front and back openings. Central primary passageway 6 is disposed for receipt of a primary wire harness, wire bundle or wire W-1.

Preferably, main body 2 contains a small-diameter cylindrical portion 7, a large-diameter cylindrical portion 8 and a funnnel-shaped portion 9 disposed between small-diameter cylindrical portion 7 and large-diameter cylindrical portion 8. Small-diameter cylindrical portion 7 has an front opening which constitutes the front opening 4 of the main body and which is defined by a front circumferential edge 7a. Preferably, an annular inner front section 7b of the small-diameter cylindrical portion 7 has formed thereon a plurality of annular ribs 10 for sealing engagement with primary wire harness or bundle W-1. Also, preferably, the front circumferential edge 7a has formed around it a front annular rim section 7c. Large-diameter cylindrical portion 8 has a back opening which constitutes the back opening 5 of the main body and which is defined by a back circumferential edge 8a. An open front end of funnel-shaped portion 9 is integrally connected to an open back end of small-diameter cylindrical portion 7 at a first intermediate circumferential edge 11, and an open back end of funnel-shaped portion 9 is integrally connected to an open front end of large-diameter cylindrical portion 8 at a second intermediate circumferential edge 12. Primary central passageway 6 extends through the interiors of portions 7, 8 and 9.

Annular body 3 surrounds a portion of main body 2 and is spaced from and integrally joined to the main body. Preferably, annular body 3 surrounds the large-diameter cylindrical portion 8 of main body 2. Annular body 3 contains a cylindrical, hollow central portion 13, a front flange portion 14, an acoustic chamber 15 formed in the front flange portion 14, an intermediate flange portion 16, a back flange portion 17, and an annular panel-fitting groove 18 formed between the intermediate and back flange portions.

Cylindrical hollow central portion 13 has an inner side wall 13a, an outer side wall 13b, an outwardly flaring annular end 13c and a back annular end 13d. The large-diameter cylindrical portion 8 of main body 2 preferably sits within the hollow center of central portion 13.

Front flange portion 14 preferably has a folded, generally cane-shaped structure and is composed of a relatively short first section 14a, an elongated second section 14b parallel to first section 14a, and a looped front section 14c disposed between the first and second sections. First section 14a is integrally joined with cylindrical hollow central portion 13 at circumferential edge 19 and extends frontwardly from edge 19. An inner side wall 20 of second section 14b is adjacent and preferably parallel to outer side wall 13b of cylindrical hollow central portion 13 so as to define acoustic chamber 15. An outer side wall 21 of second section 14b has formed on a portion thereof a plurality of circumferential ribs 22.

Intermediate flange portion 16 is preferably a flared structure having an upper annular edge 16a, a lower annular edge 16b having a greater diameter than the upper annular edge 16a, a lower annular rim section 16c, a flared outer wall 16d, and a cylindrical inner wall 16e. Inner wall 16e has a plurality of circumferential ribs 23 disposed thereon for sealing engagement with circumferential ribs 22 formed on outer side wall 21 of second section 14b of front flange portion 14. The sealing engagement of ribs 22 with ribs 23 renders acoustic chamber 15 a sealed air chamber.

Back flange portion 17 is preferably a cylindrical structure having an upper annular rim section 17a, an outer side wall 17b, a front lip 24 formed at an outer circumferential edge of the upper annular rim section 17a, and a lower annular rim section 17c.

Annular panel-fitting groove 18 is formed between intermediate and back flange portions 16 and 17. More specifically, groove 18 is preferably formed between upper annular rim section 17a of back flange portion 17 and lower annular rim section 16c of intermediate flange portion 16.

As stated previously, cylindrical hollow central portion 13 of annular body 3 preferably encircles the large-diameter cylindrical portion 8 of main body 2. Inner side wall 13a of cylindrical hollow central portion 13 is spaced from and preferably is parallel to an outer side wall 25 of large-diameter cylindrical portion 8 so as to define therebetween a secondary passageway 26. Secondary passageway 26 is disposed to receive at least one auxiliary wire W-2.

Passageway 26 has an open front end 26a and a closed bottom end which is defined by a front face (not shown) of a back annular rim section 27.

Secondary passageway 26 is spaced inwardly from acoustic chamber 15 and annular panel-fitting groove 18 and outwardly from the primary passageway 6 such that the secondary passageway does not pass through the acoustic chamber, the annular panel-fitting groove or the primary passageway. Thus, the secondary passageway does not interfere with either the sound-dampening or watertight characteristics of the grommet.

Back annular rim section 27 connects main body 2 to annular body 3 by connecting the large-diameter cylindrical portion 8 to the cylindrical hollow central portion 13.

Rim section 27 has formed therein one or more first through-holes 28 and one or more protruding members 29 having removable ends 29a. Protruding member(s) 29 protrudes (preferably perpendicularly) from a back face 27a of rim section 27. Each through-hole 28 is covered by a protruding member 29. Preferably, rim section 27 has two through-holes 28 formed therein and, accordingly, two protruding members 29 (i.e., one protruding member per through-hole). The through-hole(s) 28 and the protruding member(s) 29 are each disposed in communication with the secondary passageway 26. When an auxiliary wire(s) is to be installed, the removable end(s) 29a of protruding member 29 is removed (e.g., by snipping or piercing) to form a second through-hole(s) 30, and the end portion of the auxiliary wire disposed in secondary passageway 26 is passed through first through-hole 28 and second through-hole 30.

If desired, a sealing material (not shown) can be used to fill the space 31 between the primary wire harness or bundle W-1 and the inner wall of main body 2 and in gaps 32 formed among wires of the harness or bundle W-1. The sealing material can be a liquid resin or rubber excellent in penetrability, waterproof characteristics, and bondability to rubber and resin, and which is hardenable with the lapse of time due to chemical reaction. An example of a suitable sealing material is a two-liquid polyurethane resin based bonding agent or nitrile rubber based bonding agent. The hardened sealing material can further reduce the transmission of noise through the space 31 and the gaps 32. Furthermore, since the sealing material is of waterproof type, it is possible to perfectly prevent water from seeping through the space 31 and the gaps 32. Further, since the wire harness or bundle is strongly fixed to the grommet via the sealing material, it is unnecessary to firmly fix the grommet to the wire harness or bundle by taping, thus improving the wiring workability in mounting the grommet on an automotive vehicle, for instance.

In wiring operation, the wire harness or bundle W-1 is inserted into main body 2 through front opening 4 and passed through the main body 2 and out back opening 5. Grommet 1 can be positioned at an appropriate position on wire harness or bundle W-1 and temporarily fixed to the wire harness or bundle W-1 by taping a vinyl tape (not shown), for instance, around a border between the small-diameter cylindrical portion 7 and the wire harness or bundle W-1. If a sealing material is to be used, the grommet and the wire harness or bundle are stood together so that the large-diameter cylindrical portion 8 faces upward and the sealing material is put into the grommet from the large-diameter cylindrical portion so that the space 31 between the small-diameter cylindrical portion 7 and the wire harness or bundle W-1 and the gaps 32 formed among wires of the harness or bundle W-1 are sufficiently filled with the sealing material. With the lapse of time, the sealing material is hardened so that the grommet and the wire bundle or harness are bonded and sealed perfectly.

The grommet with the wire harness or bundle supported therein is fitted to a panel (not shown) of an automotive vehicle, for instance, with the fitting groove 18 of annular body 3 engaged with a hole (not shown) formed in the panel. The grommet is preferably installed in the panel by passing the small-diameter cylindrical portion 7 through the opening in the panel and then pulling the large-diameter cylindrical portion 8 through the opening to permit annular groove 18 to firmly seal around the opening. Where the grommet is used in a panel which separates a passenger compartment from an engine compartment in a vehicle, the wire harness or bundle equipped with grommet 1 is passed through the hole in the panel either from the engine compartment to the passenger compartment, or vice versa.

The grommet of this invention is manufactured as a one-piece structure and is preferably made of rubber or an elastomer.

Although the present invention has been shown and described with reference to FIGS. 1–3, it should not be considered as limited thereby. Thus, various possible modifications, omissions and alternatives could be conceived by one skilled in the art without departing from the scope of the present invention.

What is claimed is:

1. A one-piece grommet, comprising:
   a hollow main body having a front opening, a back opening, and central primary passageway extending between the front and back openings, the central primary passageway being disposed for receipt of a primary wire, wire harness or wire bundle;
   an annular body surrounding a portion of the main body and being spaced from and integrally joined to the main body, the annular body having a cylindrical hollow central portion, a front flange portion, an acoustic chamber formed in the front flange portion, an intermediate flange portion, a back flange portion, and an annular panel-fitting groove formed between the intermediate and back flange portions;
   a secondary passageway formed between the inner wall of the annular body and the main body, the secondary passageway being disposed for receipt of at least one auxiliary wire and being spaced inwardly from the acoustic chamber and the annular panel-fitting groove and outwardly from the primary passageway such that the secondary passageway does not pass through the acoustic chamber, the annular panel-fitting groove or the primary passageway; and
   a back annular rim section defined between the back opening of the main body and the inner wall of the annular body, the annular rim section having formed therein one or more first through-holes and one or more protruding members having removable ends and covering the one or more first through-holes, the one or more first through-holes and the one or more protruding members being disposed in communication with the secondary passageway.

2. A grommet according to claim 1, wherein the main body comprises a small-diameter cylindrical portion, a large-diameter cylindrical portion and a funnel-shaped portion disposed between the small-diameter cylindrical portion and the large-diameter cylindrical portion, the small-diameter cylindrical portion having a front opening which constitutes the front opening of the main body and the large-diameter cylindrical portion having a back opening which constitutes the back opening of the main body.

3. A grommet according to claim 2, wherein the front flange portion has a folded, cane-shaped structure and comprises a first section, an elongated second section parallel to the first section, and a looped front section disposed between the first and second sections, wherein an inner side wall of the second section is adjacent to an outer side wall of the cylindrical hollow central portion of the annular body so as to define said acoustic chamber, further wherein said outer side wall of the second section has formed on a portion thereof a plurality of first circumferential ribs.

4. A grommet according to claim 3, wherein the intermediate flange portion is a flared structure having an upper annular edge, a lower annular edge, a lower annular rim section, a flared outer wall, and a cylindrical inner wall, wherein said cylindrical inner wall has a plurality of second circumferential ribs disposed thereon for sealing engagement with the first circumferential ribs, further wherein sealing engagement of said circumferential ribs renders said acoustic chamber a sealed air chamber.

5. A grommet according to claim 4, wherein the back flange portion is a cylindrical structure having an upper annular rim section, an outer side wall, a front lip formed at an outer circumferential edge of the upper annular rim section, and a lower annular rim section.

6. A grommet according to claim 5, wherein the annular panel-fitting groove is formed between the upper annular rim section of said back flange portion and the lower annular rim section of said intermediate flange portion.

7. A grommet according to claim 6, wherein the cylindrical hollow central portion of the annular body encircles the large-diameter cylindrical portion of the main body, further wherein the cylindrical hollow central portion of the annular body has an inner side wall which is spaced from an outer side wall of the large-diameter cylindrical portion so as to define therebetween said secondary passageway.

8. A grommet according to claim 7, wherein the secondary passageway has an open front end and a closed bottom end which is defined by a front face of said back annular rim section.

9. A grommet according to claim 1, wherein the one or more protruding members protrude perpendicularly from a back face of said back annular rim section.

10. A grommet according to claim 1, wherein said back annular rim section has two of said through-holes and two of said protruding members.

11. A grommet according to claim 10, wherein a wire harness, a wire bundle or a wire is supported in the first central passageway.

12. A grommet according to claim 11, wherein at least one of said removable ends of the protruding members has been removed so as to form at least one second through-hole, further wherein at least one auxiliary wire is supported in the secondary passageway.

13. A grommet according to claim 1, wherein a wire harness, a wire bundle or a wire is supported in the first central passageway.

14. A grommet according to claim 13, wherein at least one of said removable ends of the one or more protruding members has been removed so as to form at least one second through-hole, further wherein at least one auxiliary wire is supported in the secondary passageway.

* * * * *